United States Patent
Lana

(10) Patent No.: US 9,518,528 B2
(45) Date of Patent: Dec. 13, 2016

(54) SYSTEM AND METHOD FOR FUEL INJECTOR ON-TIME CALCULATION USING FUEL SYSTEM PRESSURE PREDICTION

(71) Applicant: Cummins Inc., Columbus, IN (US)

(72) Inventor: Carlos A. Lana, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 14/904,754

(22) PCT Filed: Jul. 15, 2014

(86) PCT No.: PCT/US2014/046644
§ 371 (c)(1),
(2) Date: Jan. 13, 2016

(87) PCT Pub. No.: WO2015/009692
PCT Pub. Date: Jan. 22, 2015

(65) Prior Publication Data
US 2016/0153389 A1    Jun. 2, 2016

Related U.S. Application Data

(60) Provisional application No. 61/846,384, filed on Jul. 15, 2013.

(51) Int. Cl.
| | |
|---|---|
| *F02D 41/30* | (2006.01) |
| *F02D 41/40* | (2006.01) |
| *F02M 45/12* | (2006.01) |
| *F02M 59/20* | (2006.01) |
| *F02M 59/46* | (2006.01) |
| *F02M 59/36* | (2006.01) |
| *F02M 47/02* | (2006.01) |
| *F02D 41/38* | (2006.01) |

(52) U.S. Cl.
CPC ........ *F02D 41/401* (2013.01); *F02D 41/3082* (2013.01); *F02M 45/12* (2013.01); *F02M 47/02* (2013.01); *F02M 59/20* (2013.01); *F02M 59/36* (2013.01); *F02M 59/46* (2013.01); *F02D 2041/389* (2013.01)

(58) Field of Classification Search
CPC ...... F02D 41/401; F02D 41/30; F02D 41/047; F02D 41/3082; F02D 2041/389; F02M 51/00; F02M 45/12; F02M 47/02; F02M 59/36; F02M 59/20; F02M 59/46
USPC ....... 123/447, 456, 457, 472, 478, 490, 497, 123/510, 511; 701/103, 104, 105; 73/114.43
See application file for complete search history.

(56) References Cited

U.S. PATENT DOCUMENTS

| | | |
|---|---|---|
| 5,678,521 A | 10/1997 | Thompson et al. |
| 7,900,605 B2 | 3/2011 | Dingle |

OTHER PUBLICATIONS

International Search Report and Written Opinion dated Nov. 4, 2014 in International Application No. PCT/US14/46644.
International Preliminary Report on Patentability dated Jun. 19, 2015 in International Application No. PCT/US14/46644.

*Primary Examiner* — Hai Huynh
(74) *Attorney, Agent, or Firm* — Faegre Baker Daniels LLP

(57) ABSTRACT

The disclosure provides a system and method to calculate an actual on-time of a fuel injector. The system may include one or more modules located in a control system. The control system uses information available before the fuel injection signal is transmitted to the fuel injector to model and predict a pressure profile in a fuel system that provides high-pressure fuel to the fuel injector, and uses that information along with a fueling command to calculate an actual on-time for the fuel injector.

16 Claims, 2 Drawing Sheets

SYSTEM AND METHOD FOR FUEL INJECTOR ON-TIME CALCULATION USING FUEL SYSTEM PRESSURE PREDICTION

CROSS-REFERENCE TO RELATED APPLICATIONS

The present application claims priority to U.S. Provisional Patent Application Ser. No. 61/864,384, filed on Jul. 15, 2013, and entitled "SYSTEM AND METHOD FOR FUEL INJECTOR ON-TIME CALCULATION USING FUEL SYSTEM PRESSURE PREDICTION," the complete disclosure of which is expressly incorporated by reference herein.

TECHNICAL FIELD

This disclosure relates to fuel injectors for an internal combustion engine and a system and method for calculating an actual time of injection, called on-time, using a fuel system pressure prediction.

BACKGROUND

The amount of fuel injected by a fuel injector into a combustion chamber is a function of a fuel system supply or rail pressure, a cylinder or combustion chamber pressure, and an interval during which the fuel injector remains open, which is called the on-time. A conventional approach to determine the fuel injector on-time given a desired fuel quantity and a fuel system pressure is to use a predetermined two dimensional look-up table with fuel system, fuel rail, or common rail pressure and desired fuel quantity as independent variables or parameters and the fuel injector on-time as a dependent variable.

The challenge with the conventional approach is that the pressure profile in the fuel system may change with respect to a look-up table calibration or reference, thus changing the actual volume, amount or quantity of delivered fuel. Factors that may change the pressure profile include pressure waves in the fuel system, fuel rail, or common rail, engine speed, a start-of-injection (SOI) designed as a function of inputs other than fuel system pressure and desired fuel quantity, and fuel system pressure set-point changes.

SUMMARY

In one embodiment of the present disclosure, a fuel assembly for an engine comprises a fuel accumulator and at least one fuel injector fluidly coupled to the fuel accumulator. The fuel injector is configured to move between an open position permitting fuel to flow from the fuel injector and a closed position inhibiting fuel flow from the injector. The fuel assembly further comprises a control system which includes a controller operably coupled to the fuel injector. The controller is configured to receive at least one parameter of the fuel assembly. During operation of the engine, the controller is configured to adjust an amount of time the fuel injector remains in the open position in response to the parameter.

According to a further embodiment of the present disclosure, a fuel assembly of an engine comprises at least one fuel injector and a control system for the fuel assembly. The control system includes a controller configured to receive at least one parameter of the fuel assembly, means for determining a time fuel flows from the fuel injector, means for predicting a pressure profile of the fuel assembly during operation of the engine, and means for adjusting, during operation of the engine, the time fuel flows from the fuel injector in response to the pressure profile predicted for the fuel assembly.

In another exemplary embodiment of the present disclosure, a method of operating a fuel assembly of an engine comprises providing at least one fuel injector, receiving, during operation of the engine, parameters of the fuel assembly, and predicting, during operation of the engine, a pressure profile for the fuel assembly based on the parameters of the fuel assembly. The method further comprises calculating, during operation of the engine, an amount of time for fuel flow from the fuel injector, and transmitting, during operation of the engine, a signal to the fuel injector corresponding to the amount of time for fuel flow from the fuel injector.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 1:
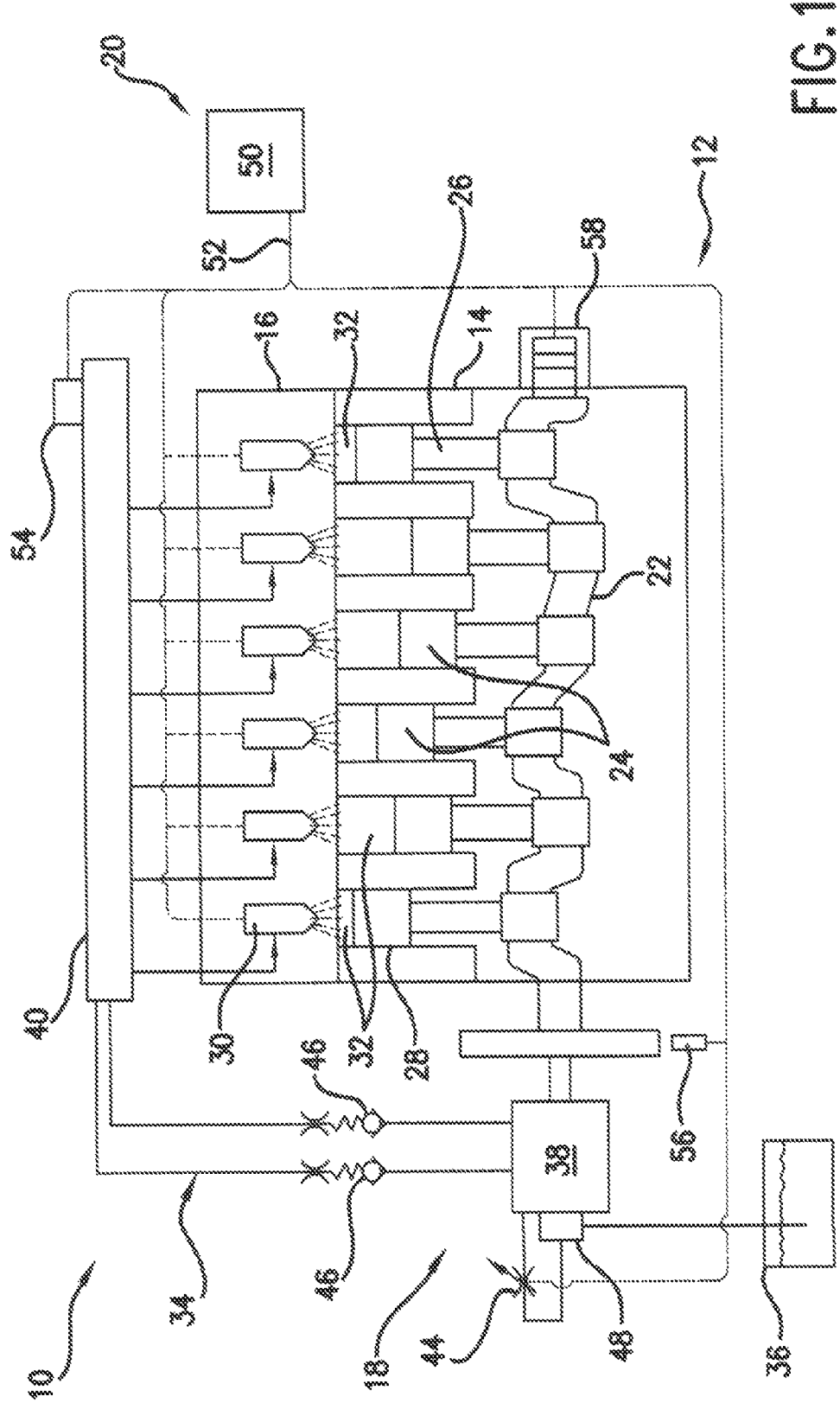
FIG. 1 is a schematic of an internal combustion engine incorporating a first exemplary embodiment of the present disclosure.

Referring to FIG. 1, a portion of an internal combustion engine in accordance with a first exemplary embodiment of the present disclosure is shown as a simplified schematic and generally indicated at 10. Engine 10 includes a control system that generates a fuel injection signal that is transmitted to an electrical driver, where the fuel injection signal is amplified. The fuel injection signal is then transmitted to a fuel injector, which opens a nozzle or needle valve element to permit fuel to flow through the fuel injector into a combustion chamber. In order to calculate an actual on-time of the fuel injector, the control system uses information available before the fuel injection signal is transmitted to the fuel injector to model and predict a pressure profile in a fuel system that provides high-pressure fuel to the fuel injector. The control system uses the pressure model along with a fueling command to calculate the fuel injector on-time. The information that may be used to model pressure in the fuel system may include a pump command, a fuel system set point or target fuel system pressure, pressure measurement signals from the fuel system, common fuel rail or accumulator dimensions, and fuel characteristics.

Engine 10 includes an engine body 12, which includes an engine block 14 and a cylinder head 16 attached to engine block 14, a fuel system 18, and a control system 20. Control system 20 receives signals from sensors located on engine 10 and transmits control signals to devices located on engine 10 to control the function of those devices. Engine body 12 includes a crank shaft 22, a plurality of pistons 24, and a plurality of connecting rods 26. Pistons 24 are positioned for reciprocal movement in a plurality of engine cylinders 28, with one piston 24 positioned in each engine cylinder 28. One connecting rod 26 connects each piston 24 to crank shaft 22. As will be seen, the movement of pistons 24 under the action of a combustion process in engine 10 causes connecting rods 26 to move crankshaft 22.

A plurality of fuel injectors 30 are positioned within cylinder head 16. Each fuel injector 30 is fluidly connected to a combustion chamber 32, each of which is formed by one piston 24, cylinder head 14, and the portion of engine cylinder 28 that extends between a respective piston 24 and cylinder head 14.

Fuel system 18 provides fuel to injectors 30, which is then injected into combustion chambers 32 by the action of fuel injectors 30, forming one or more injection events. Fuel system 18 includes a fuel circuit 34, a fuel tank 36, which contains a fuel, a high-pressure fuel pump 38 positioned along fuel circuit 34 downstream from fuel tank 36, and a fuel accumulator or rail 40 positioned along fuel circuit 34 downstream from high-pressure fuel pump 38. While fuel accumulator or rail 40 is shown as a single unit or element, accumulator 40 may be distributed over a plurality of elements that transmit or receive high-pressure fuel, such as fuel injector(s) 30, high-pressure fuel pump 38, and any lines, passages, tubes, hoses and the like that connect high-pressure fuel to the plurality of elements. Injectors 30 receive fuel from fuel accumulator 40. Fuel system 18 may further include an inlet metering valve 44 positioned along fuel circuit 34 upstream from high-pressure fuel pump 38 and one or more outlet check valves 46 positioned along fuel circuit 34 downstream from high-pressure fuel pump 38 to permit one-way fuel flow from high-pressure fuel pump 38 to fuel accumulator 40. Though not shown, additional elements may be positioned along fuel circuit 34. For example, inlet check valves may be positioned downstream from inlet metering valve 44 and upstream from high-pressure fuel pump 38, or inlet check valves may be incorporated in high-pressure fuel pump 38. Inlet metering valve 44 has the ability to vary or shut off fuel flow to high-pressure fuel pump 38, which thus shuts off fuel flow to fuel accumulator 40. Fuel circuit 34 connects fuel accumulator 40 to fuel injectors 30, which then provide controlled amounts of fuel to combustion chambers 32. Fuel system 18 may also include a low-pressure fuel pump 48 positioned along fuel circuit 34 between fuel tank 36 and high-pressure fuel pump 38. Low-pressure fuel pump 48 increases the fuel pressure to a first pressure level prior to fuel flowing into high-pressure fuel pump 38.

Control system 20 may include a controller or control module 50 and a wire harness 52. Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessor, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Control system 20 may also include an accumulator pressure sensor 54 and a crank angle sensor. While sensor 54 is described as being a pressure sensor, sensor 54 may be other devices that may be calibrated to provide a pressure signal that represents fuel pressure, such as a force transducer, strain gauge, or other device. The crank angle sensor may be a toothed wheel sensor 56, a rotary Hall sensor 58, or other type of device capable of measuring the rotational angle of crankshaft 22. Control system 20 uses signals received from accumulator pressure sensor 54 and the crank angle sensor to determine the combustion chamber receiving fuel, which is then used to analyze the signals received from accumulator pressure sensor 54.

Control module 50 may be an electronic control unit or electronic control module (ECM) that may monitor conditions of engine 10 or an associated vehicle in which engine 10 may be located. Control module 50 may be a single processor, a distributed processor, an electronic equivalent of a processor, or any combination of the aforementioned elements, as well as software, electronic storage, fixed lookup tables and the like. Control module 50 may include a digital or analog circuit. Control module 50 may connect to certain components of engine 10 by wire harness 52, though such connection may be by other means, including a wireless system. For example, control module 50 may connect to and provide control signals to inlet metering valve 44 and to fuel injectors 30.

When engine 10 is operating, combustion in combustion chambers 32 causes the movement of pistons 24. The movement of pistons 24 causes movement of connecting rods 26, which are drivingly connected to crankshaft 22, and movement of connecting rods 26 causes rotary movement of crankshaft 22. The angle of rotation of crankshaft 22 is measured by engine 10 to aid in timing of combustion events in engine 10 and for other purposes. The angle of rotation of crankshaft 22 may be measured in a plurality of locations, including a main crank pulley (not shown), an engine flywheel (not shown), an engine camshaft (not shown), or on the camshaft itself. Measurement of crankshaft 22 rotation angle may be made with toothed wheel sensor 56, rotary Hall sensor 58, and by other techniques. A signal representing the angle of rotation of crankshaft 22, also called the crank angle, is transmitted from toothed wheel sensor 56, rotary Hall sensor 58, or other device to control system 20.

Crankshaft 22 drives high-pressure fuel pump 38 and low-pressure fuel pump 48. The action of low-pressure fuel pump 48 pulls fuel from fuel tank 36 and moves the fuel along fuel circuit 34 toward inlet metering valve 44. From inlet metering valve 44, fuel flows downstream along fuel circuit 34 through inlet check valves (not shown) to high-pressure fuel pump 38. High-pressure fuel pump 38 moves the fuel downstream along fuel circuit 34 through outlet check valves 46 toward fuel accumulator or rail 40. Inlet metering valve 44 receives control signals from control system 20 and is operable to block fuel flow to high-pressure fuel pump 38. Inlet metering valve 44 may be a proportional valve or may be an on-off valve that is capable of being rapidly modulated between an open and a closed position to adjust the amount of fuel flowing through the valve.

Fuel pressure sensor 54 is connected with fuel accumulator 40 and is capable of detecting or measuring the fuel pressure in fuel accumulator 40. Fuel pressure sensor 54 sends signals indicative of the fuel pressure in fuel accumulator 40 to controller 50. Fuel accumulator 40 is connected to each fuel injector 30. Control system 20 provides control signals to fuel injectors 30 that determine operating parameters for each fuel injector 30, such as the length of time (on-time) fuel injectors 30 operate and the number of fueling pulses per a firing or injection event period, which determines the amount of fuel delivered by each fuel injector 30.

Figure 2:
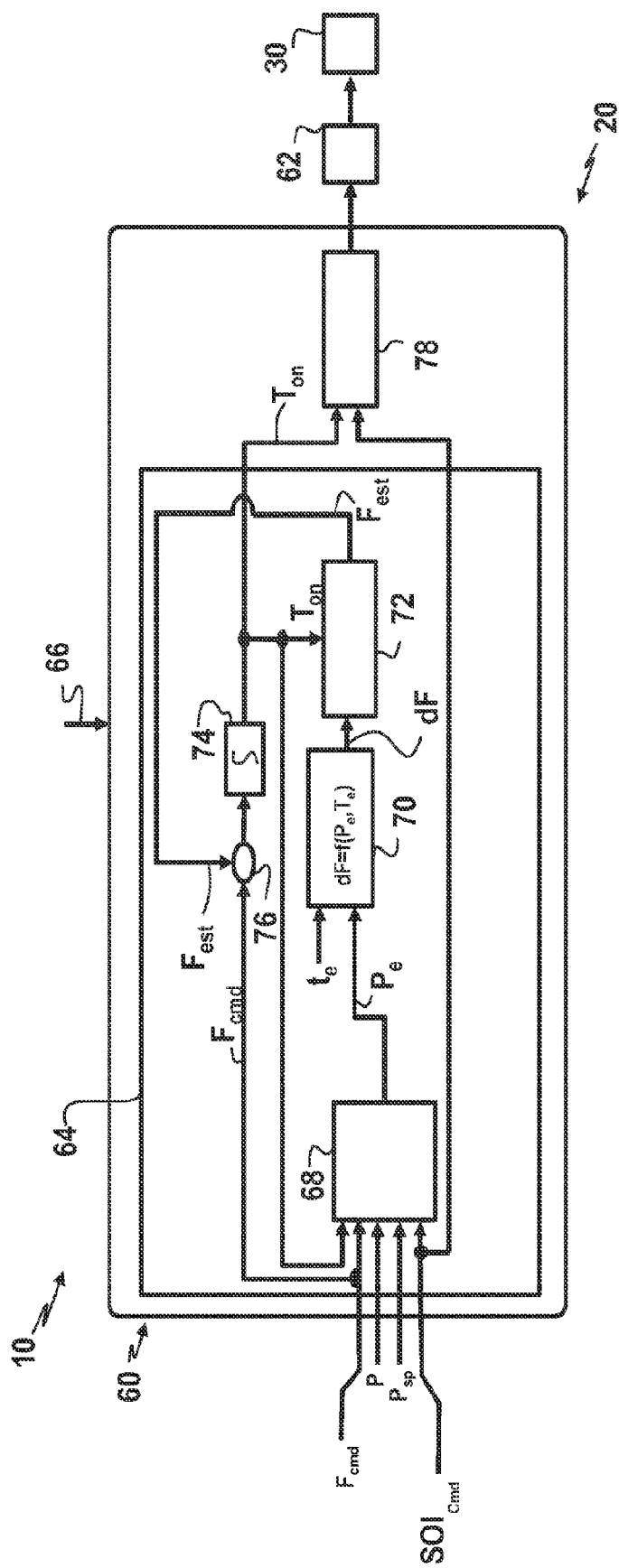
FIG. 2 is a schematic of a portion of the engine of FIG. 1.

Turning to FIG. 2, a portion of engine 10 is shown. Control system 20 includes a fuel injector pulse generation module 60. Pulse generation module 60 receives various inputs, and using those inputs, develops a fuel injector pulse or signal that is transmitted to a driver 62, which is part of engine 10, where the fuel injector pulse is amplified to be able to drive an actuator of fuel injector 30. Such amplification may be in voltage, current, or both. The amplified fuel injector pulse is then provided to fuel injector 30 to command fuel injector 30 to open, providing fuel to combustion chamber 32.

Fuel injector pulse generation module 60 includes an injector on-time module 64, which uses various inputs to develop a pulse width or on-time for a fuel injection event, which is defined as the period or interval that extends from the time that the nozzle or needle valve element (not shown) moves away from one or more injector orifices (not shown) to permit fuel to flow from the fuel injector into combustion chamber 32 to the time that the nozzle or needle valve moves to close fuel flow through the injector orifices. Fuel injector pulse generation module 60 receives an execution clock signal 66, which is used to determine the timing for events in fuel injector pulse generation module 60. Fuel injector pulse generation module 60 also receives a fuel pump command signal $F_{Cmd}$, a fuel system pressure signal P, which may be provided by accumulator pressure sensor 54, a pressure set point signal $P_{Sp}$, which represents a target pressure in fuel rail or accumulator 40, and a start-of-injection command $SOI_{Cmd}$, which initiates the fuel injection event or the time when the nozzle or needle valve element opens, which may also be described as the time when fuel injector 30 begins to open. Each of these signals may be provided from other modules within control system 20, though the fuel system pressure signal may be provided directly by accumulator pressure sensor 54. While accumulator pressure sensor 54 is shown located on fuel accumulator or rail 40, the fuel system pressure signal may be received from a pressure sensor that may be located at any high-pressure point in fuel circuit 34, which includes the high-pressure side of high-pressure fuel pump 38 to a high-pressure location in fuel injector 30, and any location between high-pressure fuel pump 38 and fuel injector 30.

Each of the signals $F_{Cmd}$, P, $P_{Sp}$, and $SOI_{Cmd}$, is received by injector on-time module 64. These signals are used by injector on-time module 64 to calculate or determine a fuel injector on-time. Injector on-time module 64 includes a pressure prediction model module 68, an injector model module 70, a summing module 72, an integration module 74 and a comparison module 76. Using $F_{Cmd}$, an initial fuel injector on-time $T_{On}$ is defined by integration module 74 and provided as an input, along with signals $F_{Cmd}$, P, $P_{Sp}$, and $SOI_{Cmd}$ to pressure prediction model module 68 to determine from the pressure prediction model located within module 68 an estimated pressure vector $P_e$. The estimated pressure vector $P_e$ along with an associated time vector $t_e$ are input into injector model module 70, which generates a vector with predicted delta fuel quantities injected by a fuel injector exposed to $P_e(i)$ for $t_e(i)$ to $t_e(i-1)$ seconds, where i=1 to the length of $t_e$. The delta fuel quantities dF may be expressed as in the form of Equation (1).

$$dF = f(P_e, t_e)$$ Equation (1)

The delta fuel quantities dF are provided to summing module 72.

Summing module 72 adds the input vectors or delta fuel quantities dF over the interval that represents $T_{On}$ to calculate an estimated amount of fuel $F_{Est}$ that would be delivered considering $T_{On}$. Estimated amount of fuel $F_{Est}$ is provided to comparison module 76. In comparison module 76, Equation (2) and Equation (3) are performed, where tol is a predetermined tolerance level that defines the acceptable deviation between $F_{Est}$ and $F_{Cmd}$ that then determines whether the calculated value of $T_{On}$ is acceptable.

$$F_{Est} - F_{Cmd} > \text{tol}$$ Equation (2)

$$F_{Est} - F_{Cmd} < -\text{tol}$$ Equation (3)

The results of the comparisons performed in Equation (2) and Equation (3) are sent to integration module 74. In integration module 74, if the condition of Equation (2) is met, then $T_{On}$ is reduced. If the condition of Equation (3) is met, then $T_{On}$ is increased. If the value of $T_{On}$ is modified, then the processes performed in pressure prediction model module 68, injector model module 70, summing module 72, and comparison module 76 is performed again until the conditions of Equation (2) and Equation (3) are no longer met. If $T_{On}$ does not meet the condition of Equation (2) and Equation (3), then the value of $T_{On}$ is considered to have converged to a stable value.

Once the value of $T_{On}$ converges to a stable value, $T_{On}$ and $SOI_{Cmd}$ are received by a TTL pulse generation module 78, which is part of fuel injector pulse generation module 60. TTL pulse generation module 78 generates a signal that will be transmitted to fuel injector 30 to control the fuel injection event. The fuel injector pulse is then transmitted to driver 62. Driver 62 amplifies the fuel injector pulse, which is then transmitted to fuel injector 30.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A fuel assembly for an engine, comprising:
   a fuel accumulator;
   at least one fuel injector fluidly coupled to the fuel accumulator, the fuel injector being configured to move between an open position permitting fuel to flow from the fuel injector and a closed position inhibiting fuel flow from the injector, each movement between the open and closed positions defining a fuel injection cycle, and the fuel injector being configured for a plurality of fuel injection cycles; and
   a control system having a controller operably coupled to the fuel injector, the controller being configured to receive at least one parameter of the fuel assembly, wherein before each of the fuel injection cycles, the controller is configured to determine an estimated pressure of the fuel assembly, calculate a plurality of fuel quantities based on the estimated pressure, calculate an estimated fuel amount from the plurality of fuel quantities, and compare the estimated fuel amount to a predetermined tolerance amount, and adjust an amount of time the fuel injector remains in the open position during each of the fuel injection cycles in response to the parameter.

2. The fuel assembly of claim 1, further comprising a fuel pump, a fuel pump sensor operably coupled to the fuel pump, and a fuel accumulator sensor operably coupled to the fuel accumulator, and the control system is configured to receive signals from the fuel pump sensor and the fuel accumulator sensor to predict the pressure profile of the fuel assembly.

3. The fuel assembly of claim 1, wherein the at least one parameter includes at least one of a fuel pump signal, a fuel assembly pressure signal, a pressure set-point signal, and a start-of-injection signal.

4. The fuel assembly of claim 1, wherein the control system further includes:
   a first module configured to determine the estimated pressure of the fuel assembly; and
   a second module configured to calculate the plurality of fuel quantities for the fuel assembly.

5. The fuel assembly of claim 4, wherein the control system includes a third module configured to calculate the estimated fuel amount from the pluralities of fuel quantities and compare the fuel quantities to the predetermined fuel amount.

6. The fuel assembly of claim 1, wherein the control system includes a module configured to send a signal to the fuel injector and adjust the amount of time the fuel injector remains in the open position.

7. A fuel assembly of an engine, comprising:
   at least one fuel injector; and
   a control system for the fuel assembly, including:
   a controller configured to receive at least one parameter of the fuel assembly;
   a first module for determining a time fuel flows from the fuel injector;
   a second module for predicting a pressure profile of the fuel assembly during injection of fuel, the second module being configured to determine an estimated pressure of the fuel assembly, calculate a plurality of fuel quantities based on the estimated pressure, calculate an estimated fuel amount from the plurality of fuel quantities, and compare the estimated fuel amount to a predetermined tolerance amount; and
   a third module for adjusting, during operation of the engine, the time fuel flows from the fuel injector in response to the pressure profile predicted for the fuel assembly.

8. The fuel assembly of claim 7, further comprising a fuel pump operably coupled to the fuel injector and a fuel pump sensor operably coupled to the fuel pump, wherein the first module is configured to receive a signal from the fuel pump sensor.

9. The fuel assembly of claim 7, wherein the fuel injector is configured to move between an open position permitting fuel flow from the fuel injector and a closed position inhibiting fuel flow from the fuel injector, and the control system includes a fourth module configured to receive the adjusted time fuel flows from the fuel injector and move the fuel injector to the open position for the adjusted initial time.

10. A method of operating a fuel injector in a fuel assembly of an engine, comprising:
   receiving, during injection of fuel, parameters of the fuel assembly;
   predicting, during injection of fuel, a pressure profile for the fuel assembly based on the parameters of the fuel assembly by:
   determining an estimated pressure of the fuel assembly;
   calculating a plurality of fuel quantities based on the estimated pressure;
   calculating an estimated fuel amount from the plurality of fuel quantities; and
   comparing the estimated fuel amount to a predetermined tolerance amount;
   calculating an amount of time for fuel flow from the fuel injector in response to predicting the pressure profile; and
   operating the fuel injector for the amount of time.

11. The method of claim 10, wherein predicting the pressure profile for the fuel assembly occurs after receiving the parameters of the fuel assembly.

12. The method of claim 10, further comprising adjusting the amount of time for fuel flow from the fuel injector based on the parameters of the fuel assembly.

13. The method of claim 10, wherein receiving parameters of the fuel assembly includes receiving at least one of a fuel pump signal, a fuel assembly pressure signal, a pressure set-point signal, and a start-of-injection signal.

14. The method of claim 10, wherein determining the estimated pressure is performed by a first control module, calculating the plurality of fuel quantities is performed by a second control module, calculating the estimated fuel amount is performed by a third control module, and comparing the estimated fuel amount to the predetermined tolerance amount is performed by a fourth control module.

15. The method of claim 10, further comprising:
   analyzing the estimated fuel amount relative to the predetermined tolerance amount;
   determining a second estimated pressure of the fuel assembly when the estimated fuel amount is outside of the predetermined tolerance amount;

calculating a second plurality of fuel quantities based on the second estimated pressure;

calculating a second estimated fuel amount from the second plurality of fuel quantities;

comparing the second estimated fuel amount to the predetermined tolerance amount; and sending a signal to the fuel injector for fuel flow when the second estimated fuel amount corresponds to the predetermined tolerance amount.

16. The method of claim 10, further comprising:

initiating a first fuel injection cycle of the fuel injector;

adjusting the amount of time for fuel flow from the fuel injector after the first fuel injection cycle; and initiating a second fuel injection cycle of the fuel injector after adjusting the amount of time for fuel flow from the fuel injector.

\* \* \* \* \*